Aug. 7, 1928.
C. B. MILLS
1,679,438
STABILIZED GYROSCOPIC COMPASS
Filed Dec. 30, 1922   2 Sheets-Sheet 1
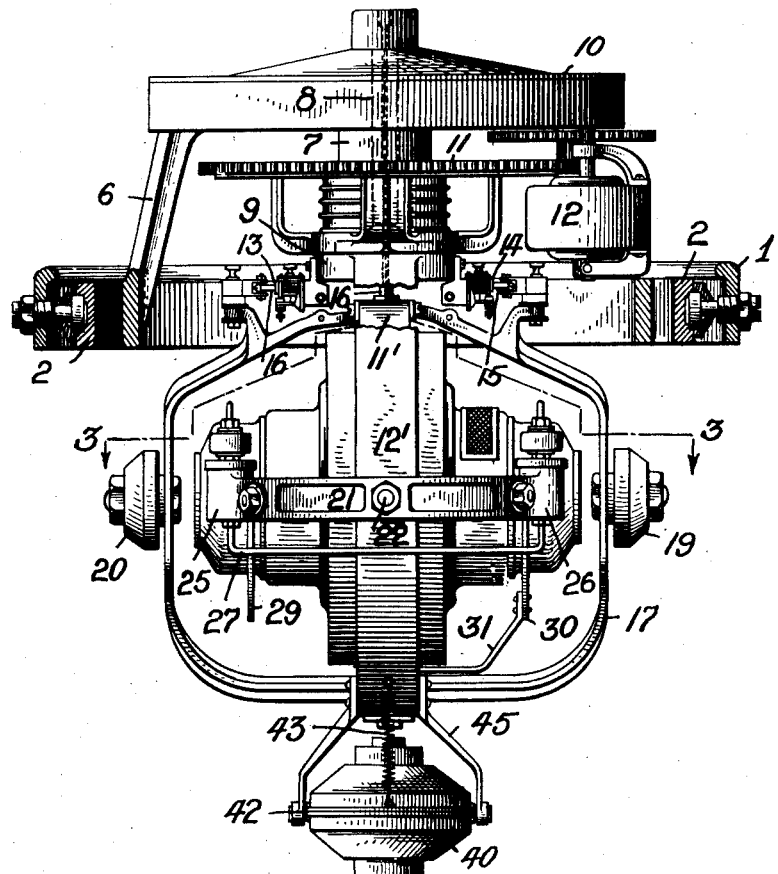
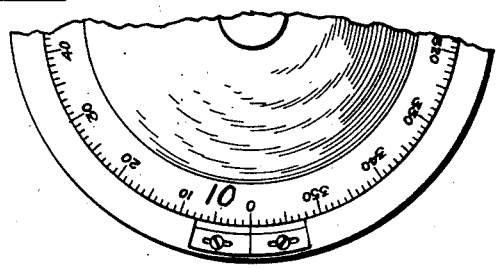
Inventor
Chester B. Mills.
By his Attorney
Herbert H. Thompson Aug. 7, 1928.
C. B. MILLS
1,679,438
STABILIZED GYROSCOPIC COMPASS
Filed Dec. 30, 1922  2 Sheets-Sheet 2
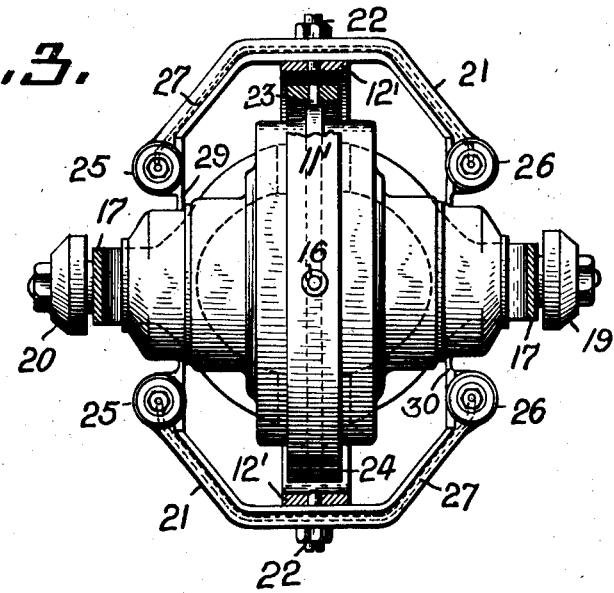
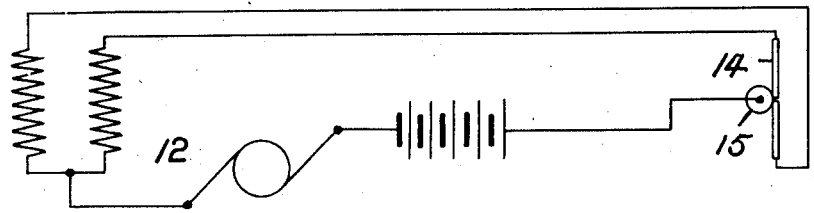
Inventor
Chester B. Mills.
By Herbert H. Thompson
his Attorney Patented Aug. 7, 1928.

1,679,438

UNITED STATES PATENT OFFICE.

CHESTER B. MILLS, OF BROOKLYN, NEW YORK, ASSIGNOR TO THE SPERRY GYROSCOPE COMPANY, OF BROOKLYN, NEW YORK, A CORPORATION OF NEW YORK.

STABILIZED GYROSCOPIC COMPASS.

Application filed December 30, 1922. Serial No. 609,809.

This invention relates to gyroscopic compasses, being specifically directed to the type of gyroscopic-compass shown in my copending application for Letters Patent, Serial No. 452,505, filed March 15, 1921, for improvements in gyroscopic compasses.

One of the objects of the invention is to improve the operation of the compass by preventing oscillation of the ring or rings supporting the gyroscope and rotor casing about the axis of the gyroscope.

A further object of the invention is an improvement of the liquid control system.

Further objects of the invention will become apparent as the description proceeds.

Referring to the drawings in which what is now considered the preferred form of my invention is shown, Fig. 1 is an east-west elevation of the compass, which is shown in simplified form to illustrate the invention more clearly.

Fig. 2 is a fragmentary plan view of the compass card.

Fig. 3 is a sectional view taken approximately on the broken line 3—3 of Fig. 1.

Fig. 4 is an elementary wiring diagram showing the operation of the follow-up system.

The compass is shown as mounted in the usual supporting ring 1, within a gimbal ring 2, which supports a spider 6. Within the central boss 7 of said spider is journaled the stem 8 of the follow-up element 9. Said stem may carry the compass card 10 adjacent the top thereof, and also a gear 11 which is rotated from the follow-up motor 12 controlled by reversing contacts 13, 14 and trolleys 15, 16 on the follow-up element and sensitive element, respectively. The sensitive element is shown as comprising the vertical ring 11' surrounded by ring 12' of the follow-up element 9. The gyro rotor casing shown is pivoted in the usual manner on horizontal axes 23 and 24 within the vertical ring. Said vertical ring it will be understood, is journaled at the top at 16 in the follow-up element, and also at the bottom, so that the two are coupled for oscillation about horizontal axes, but are free to turn relatively about the vertical axis. Secured to said vertical ring is a substantially rectangular frame 17 extending around the gyroscope in the N-S plane and supporting the compensating weights 19 and 20. Said frame may also support the trolleys 15 and 16.

Pivotally mounted on each side of the follow-up ring 12' is a frame 21, one of said frames being shown as pivoted to the follow-up ring at 22 which is preferably in line with the pivots 23, 24 of the gyro casing. Each frame supports a pair of liquid containers 25, 26, said containers being adapted to contain mercury, or other heavy liquid and are connected by a tube 27 of comparatively small bore. The two pairs of containers are shown as connected by the frames 29 and 30 and are also pivotally coupled to the lower end of the gyro casing by an arm 31 at an eccentric point in the usual manner. Said containers constitute the gravity control system for the compass for imparting the orienting couple to cause the compass to north seek.

From the well known laws of gyroscopic action, it will at once be apparent that the gyroscope will stabilize the mercury containers in the plane of the paper, i. e., in the north-south plane, but that the entire apparatus is not stabilized in the east-west plane. With all of the mercury in two tanks as shown in my said prior application, the oscillations of the system in the east-west plane may give rise to unbalanced forces, due to surging of the mercury from one end of the containers to the other. By employing double the number and reducing the size of the mercury containers, and by placing them on opposite sides of the spinning axis of the gyroscope, this effect of the mercury is minimized. The symmetrical distribution of the containers also has the following advantages; first it reduces the overall dimensions of the compass in the N-S plane and second it greatly facilitates balancing the compass, for, since the containers are located substantially on intercardinal axes, they may be added, or the quantity of mercury therein varied without disturbing the balances previously made.

While, as stated above, the gyro-casing is stabilized in the north-south plane, and consequently the mercury containers are stabilized in the north-south plane, the vertical ring and follow-up ring are not so stabilized, and therefore in rough weather, will swing back and forth at appreciable angles to the gyro casing. This may exert disturbing forces on the mercury containers through the pivots 22 as well as causing other troubles. I prefer therefore, to provide means for stabilizing these rings in that plane at least and thereby prevent as far as possible, their relative movement with respect to the gyroscope. For this purpose, I have shown a small stabilizing gyroscope 40, which may be mounted on a vertical spinning axis 41 and supported on horizontal pivots 42 in brackets 45 secured to the follow-up ring 12' and preferably at right angles to the pivots 23, 24 of the main gyroscope. This stabilizing gyroscope may be connected to a follow-up ring for instance, by centralizing springs 43.

The follow-up system is not only caused to follow the sensitive element in azimuth, but I prefer to impart to the same continuous oscillations of small amplitude. This may be secured simply by positioning the reversing contacts very close together as shown in Fig. 4, so that the trolley can never leave both contacts at the same time. Or if desired, a relay may be interposed between the trolley and azimuth motor. The follow-up element as above stated, supports the mercury containers on pivots 22. The continuous oscillation of the follow-up element consequently maintains the mercury containers in a state of oscillation and thereby prevents surface tension or any tendency of the mercury to adhere to the walls of the containers or connecting tube 27, from affecting the sensitiveness of the apparatus, since the continuous oscillations break down any temporary condition of this nature and assure the fact that at all times the surface of the mercury in the two containers lies in the same horizontal plane.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:

1. In a gyro-compass, the combination with the gyroscope, of a supporting frame for mounting the same for oscillation about a horizontal axis, compensating weights thereon on opposite sides of the gyroscope in the N-S direction, and two pairs of connected liquid containers for imparting directive power to the compass, symmetrically placed, the individual containers of each pair lying on opposite sides of the aforesaid axis, and the two pairs being respectively on opposite sides of the spinning axis of the gyroscope.

2. In a gyro-compass, the combination with a follow-up support, a sensitive element including a vertical ring mounted in said support for rotation about a vertical axis, and a gyro casing pivoted in said ring on a horizontal axis, a pair of connected liquid containers pivoted on said support on said last named axis on each side of said casing, means for maintaining said support in a state of oscillation and means for stabilizing said support in the east-west plane.

3. In a gyro-compass, the combination with the sensitive element, of a follow-up member, a motor for rotating the same, a pair of fluid containers pivoted on said member and mounted on opposite sides of said element for orienting the compass, a restricted passage connecting said containers, a connection between said containers and said sensitive element, and means for maintaining said member and said containers in a state of oscillation, said means including closely positioned reversing contacts on said follow-up member for controlling said motor, for the purpose specified.

In testimony whereof I have affixed my signature.

CHESTER B. MILLS.